(12) United States Patent
Ishikawa et al.

(10) Patent No.: US 12,436,423 B2
(45) Date of Patent: Oct. 7, 2025

(54) DISPLAY DEVICE

(71) Applicant: Magnolia White Corporation, Tokyo (JP)

(72) Inventors: Tomokazu Ishikawa, Tokyo (JP); Masaru Nakakomi, Tokyo (JP); Masateru Morimoto, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/809,436

(22) Filed: Aug. 20, 2024

(65) Prior Publication Data

US 2025/0076702 A1  Mar. 6, 2025

(30) Foreign Application Priority Data

Aug. 30, 2023 (JP) ................. 2023-139427

(51) Int. Cl.
*G02F 1/1335* (2006.01)
*G02F 1/1343* (2006.01)

(52) U.S. Cl.
CPC .. *G02F 1/133512* (2013.01); *G02F 1/133514* (2013.01); *G02F 1/133531* (2021.01); *G02F 1/134336* (2013.01); *G02F 2201/123* (2013.01)

(58) Field of Classification Search
CPC ......... G02F 1/133512; G02F 1/133514; G02F 1/133531; G02F 1/134336; G02F 2201/123
See application file for complete search history.

(56) References Cited

U.S. PATENT DOCUMENTS

| 2014/0092334 A1* | 4/2014 | Ishikawa ........... G02F 1/133512 445/25 |
| 2023/0061880 A1 | 3/2023 | Watanabe et al. |

FOREIGN PATENT DOCUMENTS

JP       2023036194 A    3/2023

\* cited by examiner

*Primary Examiner* — Kevin Quarterman
(74) *Attorney, Agent, or Firm* — Maier & Maier, PLLC

(57) ABSTRACT

According to one embodiment, a display device includes a first substrate, a second substrate, and a liquid crystal layer. The first substrate includes first pixels overlapping with a display area and second pixels overlapping with a surrounding area, color filters corresponding to each of the first pixels, and a first light-shielding layer including an aperture overlapping with each of the first and second pixels. The second substrate includes a second light-shielding layer surrounding the display area. The width of the first light-shielding layer arranged at a position overlapping with an end portion of the display area is greater than a width between apertures overlapping with each of first pixels adjacent to each other.

9 Claims, 16 Drawing Sheets

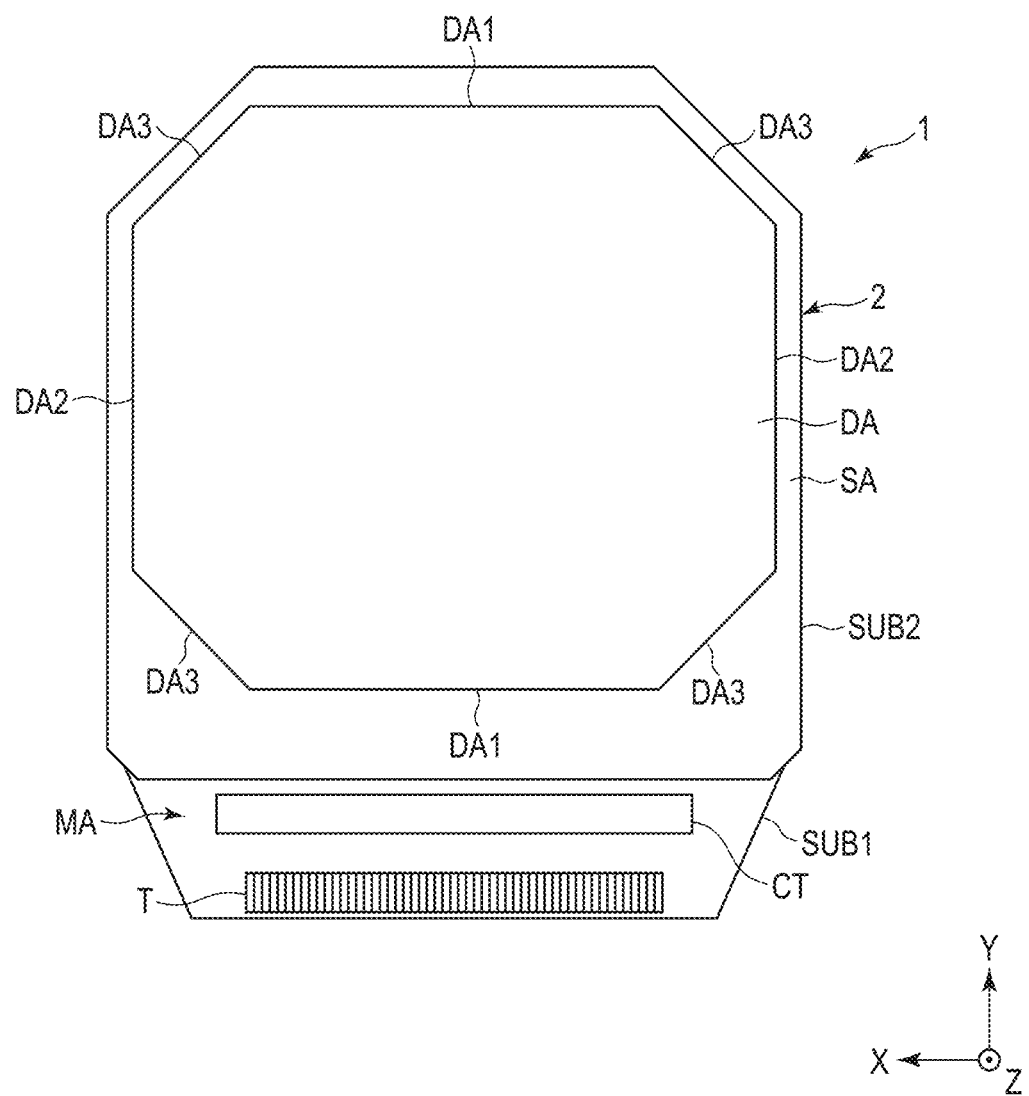
F I G. 1

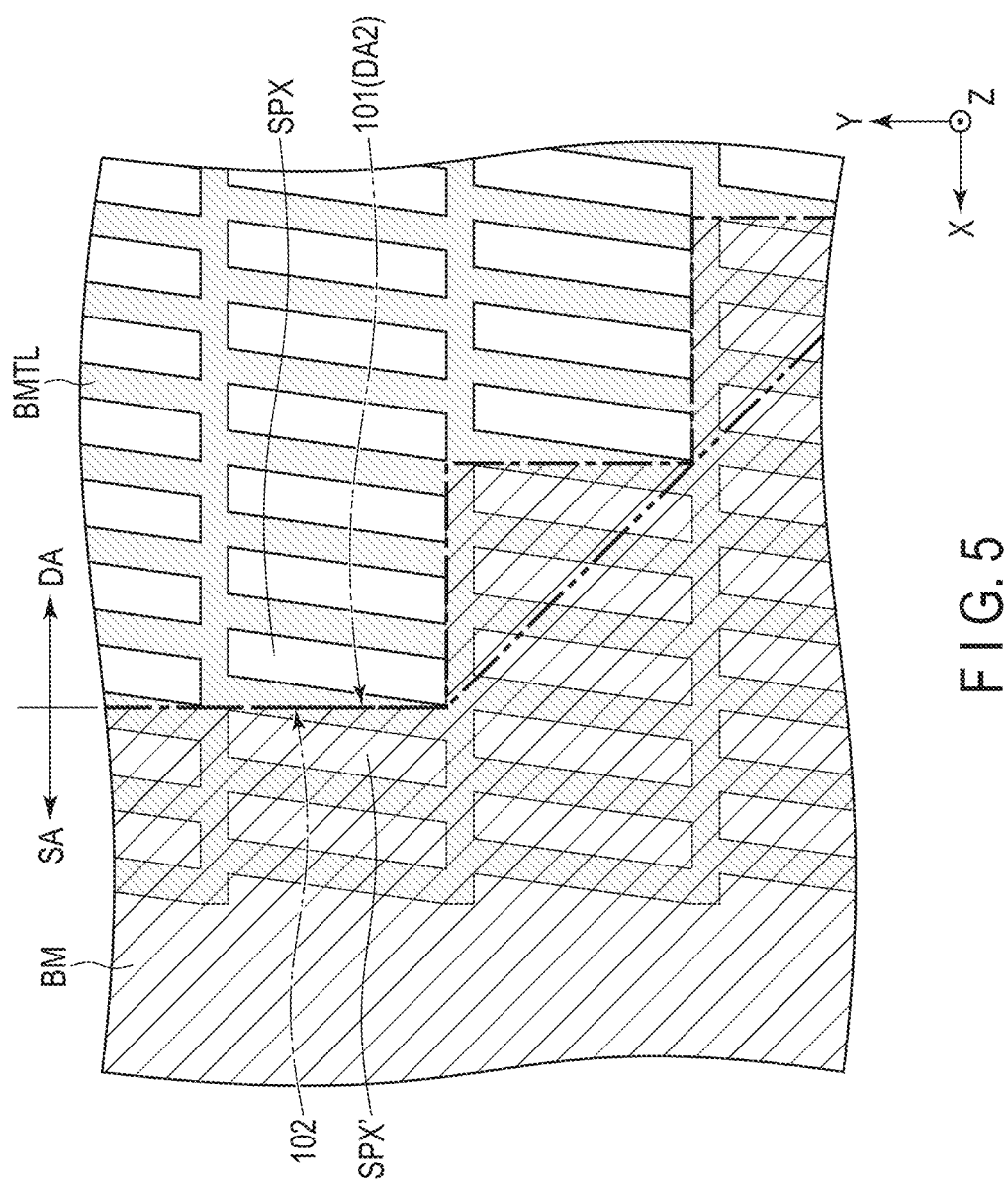
F I G. 5

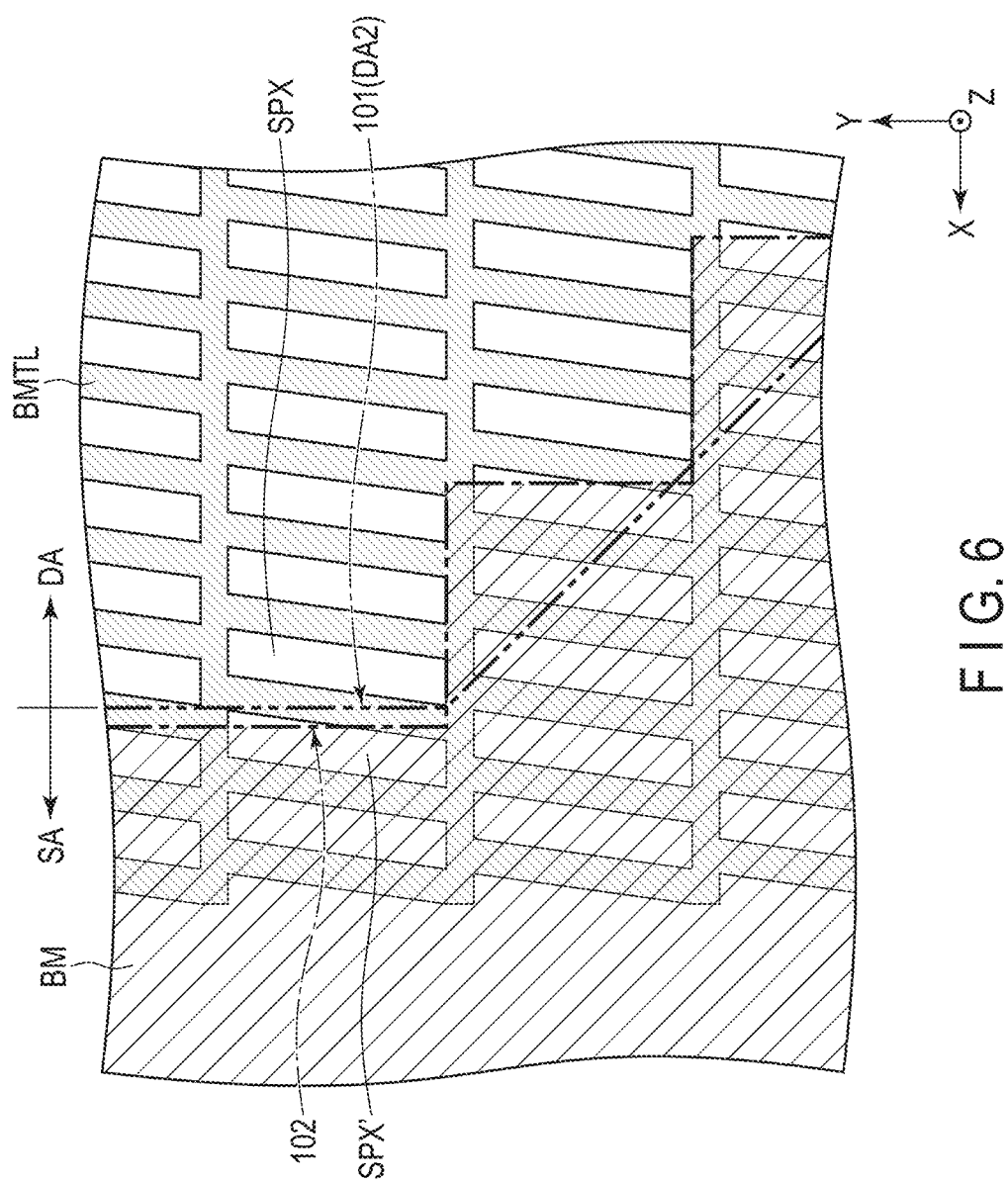
F I G. 6

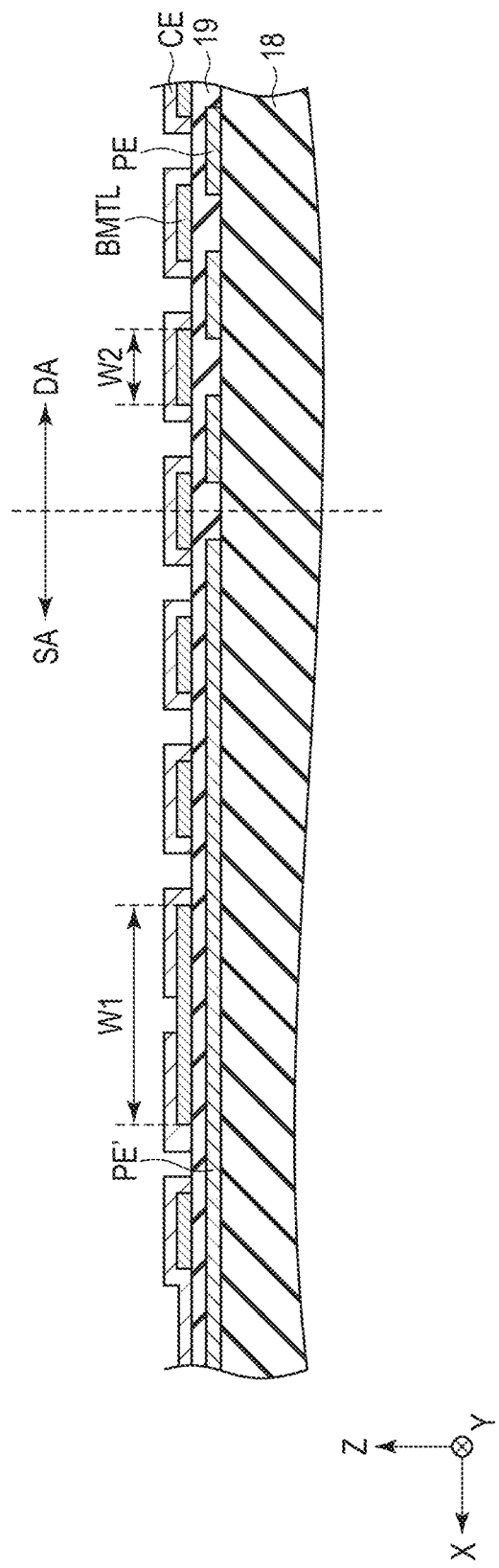
F I G. 14

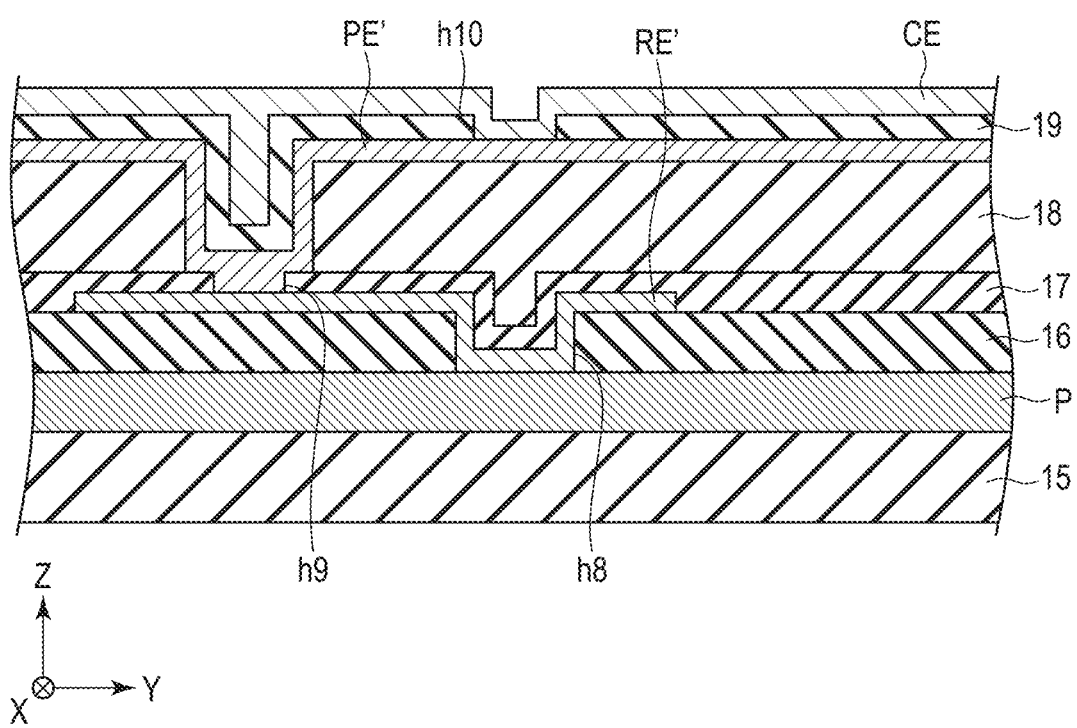
F I G. 16

DISPLAY DEVICE

CROSS-REFERENCE TO RELATED APPLICATIONS

This application is based upon and claims the benefit of priority from Japanese Patent Application No. 2023-139427, filed Aug. 30, 2023, the entire contents of which are incorporated herein by reference.

FIELD

Embodiments described herein relate generally to a display device.

BACKGROUND

As an example of a display device, a liquid crystal display device that includes a pair of substrates and a liquid crystal layer arranged between the pair of substrates is known. In a liquid crystal display device capable of executing color displaying, a color filter is provided on one of the pair of substrates.

In many cases, the color filter is often installed on an opposed substrate, which is different from an array substrate that includes switching elements and pixel electrodes. For example, a liquid crystal display device that achieves high resolution may adopt a configuration in which the color filter is provided on the array substrate.

In the configuration in which the color filter is provided on the array substrate, bonding the array substrate and the opposed substrate together is relatively easy, compared to the configuration in which the color filter is provided on the opposed substrate. On the other hand, a deviation in this bonding in the configuration in which the color filter is provided on the array substrate may degrade display quality in a display device.

BRIEF DESCRIPTION OF THE DRAWINGS

FIG. 1 is a schematic plan view of a display device of an embodiment.

FIG. 5 is a diagram illustrating a first light-shielding layer in a comparative example of the present embodiment.

FIG. 6 is a diagram illustrating the first light-shielding layer in the comparative example of the present embodiment.

FIG. 14 is a schematic cross-sectional view of the display panel along B-B line shown in FIG. 12.

FIG. 16 is a schematic cross-sectional view of the display panel along D-D line shown in FIG. 12.

DETAILED DESCRIPTION

Figure 2:
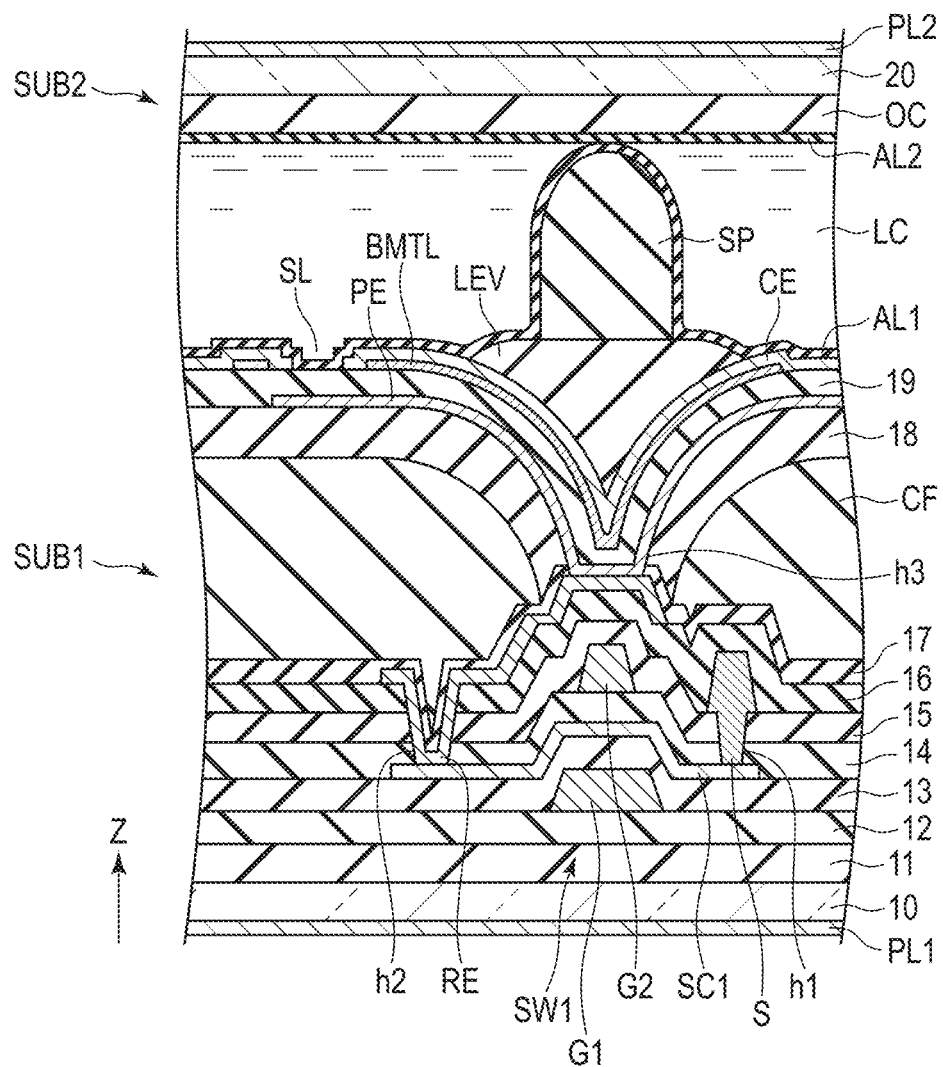
FIG. 2 is a schematic cross-sectional view of a display area in a display panel.

In general, according to one embodiment, a display device includes a first substrate, a second substrate opposed to the first substrate, and a liquid crystal layer held between the first substrate and the second substrate. The first substrate includes a plurality of first pixels overlapping with a display area and a plurality of second pixels overlapping with a surrounding area around the display area, the plurality of first pixels and the plurality of second pixels being arrayed on the first substrate in a matrix in a first direction and a second direction, a plurality of color filters corresponding to each of the plurality of first pixels, and a first light-shielding layer including an aperture overlapping with each of the plurality of first pixels and the plurality of second pixels. The second substrate includes a second light-shielding layer surrounding the display area and overlapping with the surrounding area in plan view. The width in the first direction of the first light-shielding layer arranged at a position overlapping with an end portion elongating in the second direction of the display area is greater than a width between apertures overlapping with each of a plurality of first pixels adjacent to each other in the first direction, among the plurality of first pixels.

Embodiments will be described hereinafter with reference to the accompanying drawings.

Incidentally, the disclosure is merely an example, and proper changes within the spirit of the invention, which are easily conceivable by a skilled person, are included in the scope of the invention as a matter of course. In addition, in some cases, in order to make the description clearer, the drawings may be more schematic than in the actual modes, but they are mere examples, and do not limit the interpretation of the present invention. In the drawings, reference numbers of continuously arranged elements equivalent or similar to each other are omitted in some cases. In addition, in the specification and drawings, the same elements as those described in connection with preceding drawings are denoted by like reference numbers, and detailed description thereof is omitted unless necessary.

FIG. 1 is a plan view of a display device 1 of the present embodiment. In the present embodiment, an X direction, a Y direction, and a Z direction are defined as shown in FIG. 1. The directions X, Y, and Z are orthogonal to each other in the present embodiment, but may intersect at an angle other than 90 degrees. In the following descriptions, viewing the display device 1 and its components parallel to the Z direction is referred to as plan view. In the following descriptions, viewing the display device 1 and its components parallel to the X direction or Y direction is referred to as a cross-sectional view.

As shown in FIG. 1, the display device 1 includes a display panel 2 that includes a first substrate SUB1 (array substrate), a second substrate SUB2 (opposed substrate) opposed to the first substrate SUB1, and a liquid crystal layer (not shown) enclosed (held) between the first substrate SUB1 and the second substrates SUB2. The display device 1 is, for example, a transmissive liquid crystal display device including an illumination device (not shown) at a back surface of the display panel 2.

In addition, the display panel 2 includes a display area DA and a surrounding area (picture frame area) SA around the display area DA. As shown in FIG. 1, the display area DA has a polygonal shape having, for example, a side DA1 along the X direction, a side DA2 along the Y direction, and a side DA3 along a direction intersecting the X direction and the Y direction. In the example shown in FIG. 1, the display area DA has an octagonal shape, but may have other shapes.

Though omitted in FIG. 1, a plurality of pixels are arrayed in matrix in the display area DA in the X direction and the Y direction. In addition, each of the plurality of pixels arranged in the display area DA includes a plurality of subpixels. In the present embodiment, the pixel PX includes, for example, a red subpixel, a green subpixel, and a blue sub-pixel. The pixel may include a subpixel displaying other color such as white.

In the example shown in FIG. 1, the lower side of the substrate SUB1 in the figure protrudes in the direction opposite to the tip of the Y direction further than the second substrate SUB2 does. By this configuration, a mounting area MA, which does not overlap with the second substrate SUB2, is formed on the first substrate SUB1. The mounting area MA is a part of the surrounding area SA.

A controller CT is mounted in the mounting area MA. The controller CT can be composed of IC and various circuit elements. In addition, a terminal portion T is provided in the mounting area MA, and a flexible printed circuit (not shown) is connected to the terminal portion T. The flexible printed circuit inputs various signals transmitted from substrates and the like of an electronic device on which the display device 1 is mounted, to the controller CT. Based on the input signals, the controller CT supplies image signals to a selector circuit (not shown) and controls a gate driver and the selector circuit. The gate driver supplies gate signals sequentially to gate lines (not shown), which elongate in the X direction and are arrayed in the Y direction. The selector circuit supplies the input image signals to signal lines (not shown), which elongate in the Y direction and are arrayed in the X direction.

The display device 1 shown in FIG. 1 can be used, for example, in electronic devices such as head-mounted displays that display images for Virtual Reality (VR). The display device 1 may be used for various devices such as a vehicle-mounted device, a smartphone, a tablet, a mobile phone, a personal computer, a television receiver, a game console, and the like.

FIG. 2 is a schematic cross-sectional view of the display panel 2 in the display area DA. As shown in FIG. 2, the first substrate SUB1 includes a first insulating substrate 10 such as a glass substrate having a light transmitting property or a resin substrate having flexibility.

The insulating layer 11 is arranged on the first insulating substrate 10 so as to cover the first insulating substrate 10. The insulating layer 12 is arranged on the insulating layer 11 so as to cover the insulating layer 11.

A gate line G1 is arranged on the insulating layer 12. An insulating layer 13 is arranged on the insulating layer 12 and the gate line G1 so as to cover the insulating layer 12 and the gate line G1.

A semiconductor layer SC1 is arranged, for example, on the insulating layer 13 and is formed of an oxide semiconductor (OS), which is a transparent semiconductor. Typical examples of the oxide semiconductor are indium-gallium-zinc oxide (IGaZnO), indium gallium oxide (InGaO), indium zinc oxide (InZnO), zinc tin oxide (ZnSnO), zinc oxide (ZnO), and the like.

An insulating layer 14 is arranged on the insulating layer 13 and the semiconductor layer SC1 to cover the insulating layer 13 and the semiconductor layer SC1.

A gate line G2 is arranged on the insulating layer 14. The gate line G2 is opposed to a channel area of the semiconductor layer SC1. The gate line G2 is connected to the gate line G1 through contact holes (not shown) formed in the insulating layer 13 and the insulating layer 14.

An insulating layer 15 is arranged on the insulating layer 14 and the gate line G2 so as to cover the insulating layer 14 and the gate line G2.

The signal lines S are arranged on the insulating layer 15. The signal lines S are connected to the semiconductor layer SC1 through a contact hall h1 formed in the insulating layers 14 and 15.

An insulating layer 16 is arranged on the insulating layer 15 and the signal lines S so as to cover the insulating layer 15 and the signal lines S.

A relay electrode RE is arranged in the insulating layer 16. The relay electrode RE is connected to the semiconductor layer SC1 through a contact hole h2 formed in the insulating layers 14 to 16. The relay electrode RE is formed of a transparent conductive material having a light transmitting property, for example, indium tin oxide (ITO) and the like.

As described above, each of the plurality of pixels (sub-pixels) arranged in the display area DA includes a switching element SW1 (thin-film transistor). The switching element SW1 is constituted by the semiconductor layer SC1, a gate electrode, a source electrode, a drain electrode, and the like. In the example shown in FIG. 2, the gate lines G1 and G2 function as the gate electrodes, and the switching element SW1 has a dual gate structure. The signal line S functions as one of the source electrode and the drain electrode. The relay electrode RE functions as the other of the source electrode and the drain electrode.

An insulating layer 17 is arranged on the insulating layer 16 and the relay electrode RE so as to cover the insulating layer 16 and the relay electrode RE. The insulating layer 17 functions to shield foreign substances such as moisture and gases moving from the color filter CF described later toward the insulating substrate 10 side.

A plurality of color filters CF corresponding to the plurality of sub-pixels respectively are arranged on the insulating layer 17. More specifically, the plurality of color filters CF include a red color filter corresponding to a subpixel that displays red, a green color filter corresponding to a subpixel that displays green, and a blue color filter corresponding to a subpixel that displays blue.

In the present embodiment, the first substrate SUB1 (array substrate) includes the color filters CF. This configuration of the display device 1 is referred to as a color filter-on-array (COA) structure.

An insulating layer 18 is arranged on the insulating layer 17 and the color filter CF so as to cover the insulating layer 17 and the color filter CF. The insulating layer 18 is formed of an organic insulating material.

A pixel electrode PE is arranged on the insulating layer 18. The pixel electrode PE is connected to the relay electrode RE through a contact hole h3 formed in the insulating layer 17 and the insulating layer 18. The pixel electrode PE is formed of a transparent conductive material having light transmitting property such as ITO.

An insulating layer 19 is arranged on the insulating layer 18 and the pixel electrode PE so as to cover the insulating layer 18 and the pixel electrode PE.

All of the Insulating layers 11, 12, 13, 14, 15, 16, 17, 18, and 19 are transparent inorganic insulating layers and are formed of silicon oxide, silicon nitride, and silicon oxynitride and the like. The Insulating layer 18 is a transparent organic insulating layer.

A first light-shielding layer BMTL is arranged on the insulating layer 19. The first light-shielding layer BMTL is formed of a light-shielding material such as metal. In FIG. 2, the first light-shielding layer BMTL is arranged between two color filters CF. This first light-shielding layer BMTL is formed in a grid shape to define each of the plurality of color filters CF (in other words, the plurality of subpixels) in plan view. That is, the first light-shielding layer BMTL is formed to include apertures overlapping with the plurality of subpixels respectively.

The common electrode CE is arranged on the insulating layer 19 and the first light-shielding layer BMTL so as to cover the insulating layer 19 and the first light-shielding layer BMTL. The common electrode CE is arranged over the plurality of pixels (subpixels) and may include a slit SL at a position overlapping with the pixel electrode PE in plan view. The common electrode CE is formed of a transparent conductive material having light transmitting property, for example ITO and the like.

An insulating layer LEV for flattening a recess portion formed due to the contact hole h3 is arranged at a position overlapping with a part of the common electrode CE. The insulating layer LEV is formed of an organic insulating material.

A spacer SP is arranged on the insulating layer LEV. The spacer SP is formed of an organic insulating material and has, for example, a columnar shape. The spacer SP functions as a holding member that holds gap, which forms a liquid crystal layer LC, between the first substrate SUB1 and the second substrate SUB2.

An alignment film AL1 is arranged on the insulating layer 19, the common electrode CE, the insulating layer LEV, and the spacer SP so as to cover the insulating layer 19, the common electrode CE, the insulating layer LEV, and the spacer SP.

On the other hand, the second substrate SUB2 includes a second insulating substrate 20, such as a glass substrate having light transmitting property and a resin substrate. An overcoat layer OC is arranged to cover the second insulating substrate 20. The overcoat layer OC is formed of an organic insulating material. In addition, the alignment film AL1 is arranged to cover the overcoat layer OC.

The first substrate SUB1 and the second substrate SUB2 are bonded together by an annular seal member arranged in the surrounding area SA. The liquid crystal layer LC is enclosed between the first substrate SUB1 and the second substrate SUB2.

The alignment films AL1 and AL2 have the function to align liquid crystal molecules contained in the liquid crystal layer LC in initial alignment direction. As an example, the alignment films AL1 and AL2 are photo-alignment films to which photo-alignment treatment irradiating polymer film such as polyimide with ultraviolet rays to provide the film with the polymer anisotropic is conducted. The alignment films AL1 and AL2 may be rubbing alignment films for which rubbing treatment is conducted. In addition, one of the alignment films AL1 and AL2 may be a photo-alignment film. The other may be a rubbing alignment film.

A first polarizer PL1 is opposed to the first substrate SUB1 and is bonded to the first insulating substrate 10. A second polarizer PL2 is opposed to the second substrate SUB2 and is bonded to the second insulating substrate 20. The transmission axis of the first polarizer PL1 is orthogonal to the transmission axis of the second polarizer PL2.

When the display device 1 is off state in which an electric field is not formed between the pixel electrode PE and the common electrode CE, the liquid crystal molecules contained in the liquid crystal layer LC are maintained in the initial alignment state. In this state, the transmission axis of the first polarizer PL1 and the transmission axis of the second polarizer PL2 are orthogonal to each other. Thus, light from the illumination device is shielded. Thus, a pixel displays black color.

When an image signal is supplied to the pixel electrode PE, an electric field is formed between the pixel electrode PE and the common electrode CE. The electric field formed in this manner acts on the liquid crystal layer LC through the slit SL to align the liquid crystal molecules contained in the liquid crystal layer LC in a direction different from the initial alignment direction. At this time, some of the light from the illumination device passes through the second polarizer PL2.

Figure 3:
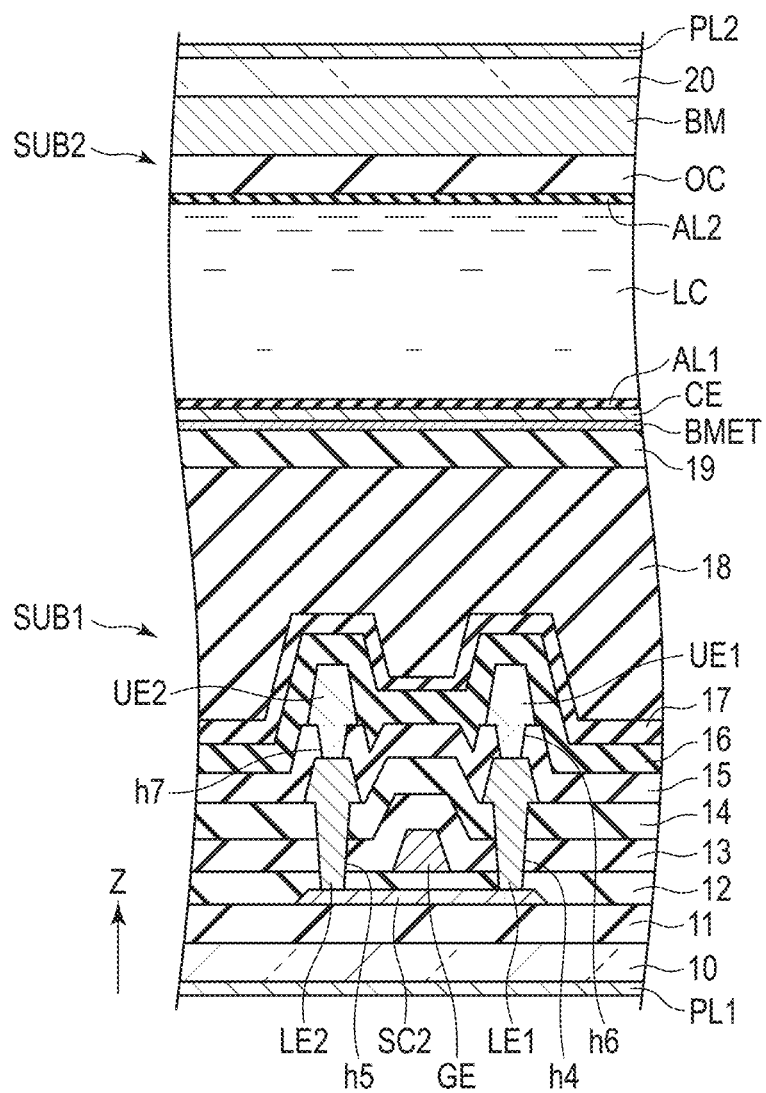
FIG. 3 is a schematic cross-sectional view of a surrounding area in the display panel.

FIG. 3 is a schematic cross-sectional view showing the surrounding area SA in the display panel 2. Elements shown in FIG. 3 equivalent to those shown in FIG. 2 are denoted by the same reference numbers, and detailed descriptions thereof are omitted.

In the surrounding area SA, a semiconductor layer SC2 is arranged on the insulating layer 11. The semiconductor layer SC2 is formed of polycrystalline silicon. The semiconductor layer SC2 is covered with the insulating layer 12.

A gate electrode GE is arranged on the insulating layer 12. The gate electrode GE is covered with the insulating layer 13. The insulating layer 13 is covered with the insulating layer 14.

First electrodes LE1 and LE2 are arranged on the insulating layer 14. The first electrode LE1 is connected to the semiconductor layer SC2 through a contact hole h4 formed in the insulating layers 12 to 14. Similarly, the first electrode LE2 is connected to the semiconductor layer SC2 through a contact hole h5 formed in the insulating layers 12 to 14. The first electrodes LE1 and LE2 are arranged at positions opposed to each other with a channel area of the semiconductor layer SC2 interposed therebetween. The first electrodes LE1 and LE2 are covered with the insulating layer 15.

Second electrodes UE1 and UE2 are arranged on the insulating layer 15. The second electrode UE1 is connected to the first electrode LE1 through a contact hole h6 formed in the insulating layer 15. The second electrode UE2 is connected to the first electrode LE2 through a contact hole h7 formed in the insulating layer 15.

For example, the gate driver is arranged in the surrounding area SA of the display panel 2. The semiconductor layer SC2, the gate electrode GE, the first electrodes LE1 and LE2 (source and drain electrodes) and the like constitute a switching element SW2 to realize the gate driver (gate drive circuit).

In the display area DA, the second substrate SUB2 is described as including the second insulating substrate 20, the overcoat layer OC, and the alignment film AL2. However, in the second substrate SUB2 in the surrounding area SA, a second light-shielding layer BM is arranged between the second insulating substrate 20 and the overcoat layer OC.

Here, as described above, the liquid crystal layer LC is held by the seal member bonding the first substrate SUB1 and the second substrate SUB2 together in the surrounding area SA.

Figure 4:
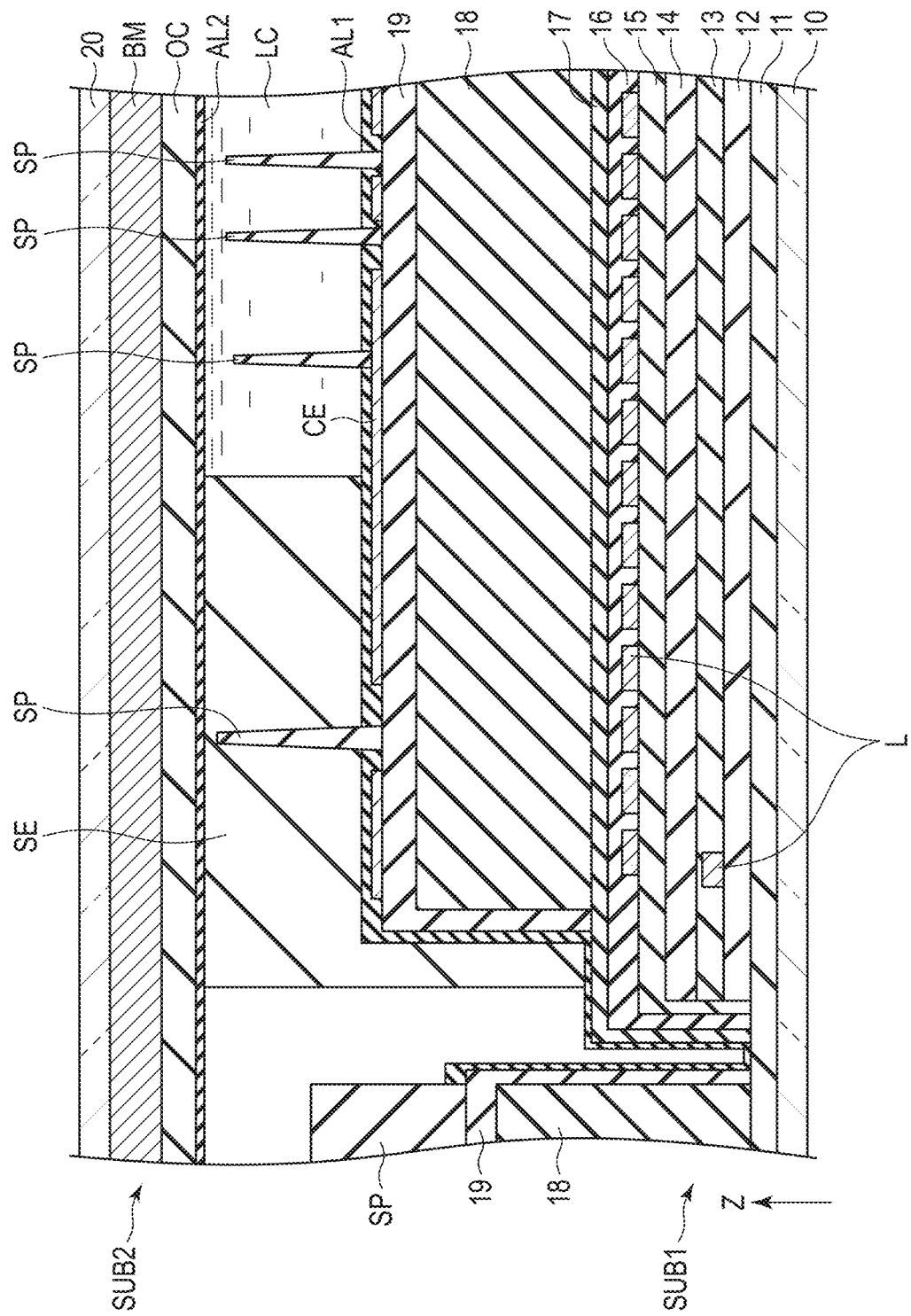
FIG. 4 is a schematic cross-sectional view of the surrounding area in which the seal member is arranged.

FIG. 4 is a schematic cross-sectional view of the surrounding area SA in which the seal member is arranged. FIG. 3 shows the surrounding area SA. FIG. 4 shows an area closer to an end portion of the display panel 2 than the area shown in FIG. 3 is.

A seal member SE is arranged in the surrounding area SA shown in FIG. 4. The seal member SE bonds the first substrate SUB1 and the second substrate SUB2 together.

In the surrounding area SA, various surrounding lines L are arranged on the insulating layer 12 (in other words, on the same layer as the gate line G2) and on the insulating layer 15 (in other words, on the same layer as the signal lines S), for example.

Further, as described with reference to FIG. 3, the second light-shielding layer BM is arranged between the second insulating substrate 20 and the overcoat layer OC.

Here, for example, alignment of a pixel (subpixel) arranged on the first substrate SUB1 side and a color filter corresponding to this pixel (in other words, accurately bonding the first substrate SUB1 and the second substrate SUB2 together) is difficult in a configuration in which the color filter CF is arranged on the second substrate SUB2 side. The display device 1 of the present embodiment has the COA structure as described above and thus can relatively readily bond the first substrate SUB1 and the second substrate SUB2 together in the manufacturing process of the display device 1, contributing to high definition of pixels.

However, as described with reference to FIG. 3 and FIG. 4, when the second substrate SUB2 includes the second light-shielding layer BM in the surrounding area SA, the second light-shielding layer BM is arranged to surround the display area DA. Therefore, in the display device 1 of the present embodiment, it is necessary to bond the first substrate SUB1 and the second substrate SUB2 together such that at least an end portion of the display area DA (in other words, the boundary between the display area DA and the surrounding area SA) and the end portion of the second light-shielding layer BM coincident with each other. When a misalignment occurs in the bonding, appropriate light shielding is not achieved (in other words, light from the illumination device or reflected light from lines and the like leak out from the boundary of the display area DA), degrading display quality in the display device 1.

The display device 1 of the present embodiment has a configuration that can suppress the degradation of display quality in the display device 1 even when misalignment occurs in the bonding of the first substrate SUB1 and the second substrate SUB2.

The first light-shielding layer BMTL of a comparative example of the present embodiment will be described with reference to FIG. 5. FIG. 5 shows an enlarged view of the first light-shielding layer BMTL and the second light-shielding layer BM at the boundary between the display area DA and the surrounding area SA.

As shown in FIG. 5, the first light-shielding layer BMTL is arranged over the display area DA and at least a part of the surrounding area SA.

The first light-shielding layer BMTL has apertures overlapping with a plurality of subpixels SPX respectively, for example, in the display area DA. In addition, in order to reduce the variation in etching amount and the like in forming the apertures that the first light-shielding layer BMTL has, the first light-shielding layer BMTL further has apertures overlapping a plurality of dummy pixels SPX' at least partially overlapping with the surrounding area SA, respectively. In other words, the first light-shielding layer BMTL is formed in the same pattern in the display area DA and the surrounding area SA so as to define each of the plurality of subpixels SPX and the plurality of dummy pixels SPX'.

The plurality of subpixels SPX include, for example, a subpixel configured to display red by arranging a red color filter CF, a subpixel configured to display green by arranging a green color filter CF, and a subpixel configured to display blue by arranging a blue color filter CF. These three subpixels SPX configured to display red, green, and blue constitute one pixel.

As described above, at a position overlapping with the plurality of subpixels SP, a color filter CF corresponding to each of the subpixel is arranged. At a position overlapping with the plurality of dummy pixels SPX', a color filter CF corresponding to each of the dummy pixel SPX' may not be arranged.

In FIG. 5, an example is shown where an end portion 101 (in other words, a side DA2 of the display area DA) elongating in the Y direction of the display area DA (or surrounding area SA) and an end portion 102 elongating in the Y direction of the second light-shielding layer BM coincide with each other. In this case, the second light-shielding layer BM is arranged above an aperture overlapping with the dummy pixel SPX' arranged in the surrounding area SA, and thus light from the dummy pixel SPX', for example, does not leak out.

In contrast, as shown in FIG. 6, the following assume a case where there is a misalignment in the bonding of the first substrate SUB1 on which the first light-shielding layer BMTL is arranged and the second substrate SUB2 on which the second light-shielding layer BM is arranged. FIG. 6 assumes a case where the second substrate SUB2 is misaligned in the X direction.

In this case, some of the dummy pixels SPX' arranged in the vicinity of the end portion 101 elongating in the Y direction of the display area DA do not overlap with the second light-shielding layer BM (in other words, are exposed from the second light-shielding layer BM) in the comparative example of the present embodiment. Thus, in the comparative example, the misalignment in the bonding of the first substrate SUB1 and the second substrate SUB2 makes light from the dummy pixels SPX' leak out, degrading the display quality in the vicinity of the display area DA.

Next, the first light-shielding layer BMTL of the present embodiment will be described with reference to FIG. 7. Similarly to FIG. 5, FIG. 7 shows an enlarged view of the first light-shielding layer BMTL and the second light-shielding layer BM at the boundary portion between the display area DA and the surrounding area SA.

Figure 7:
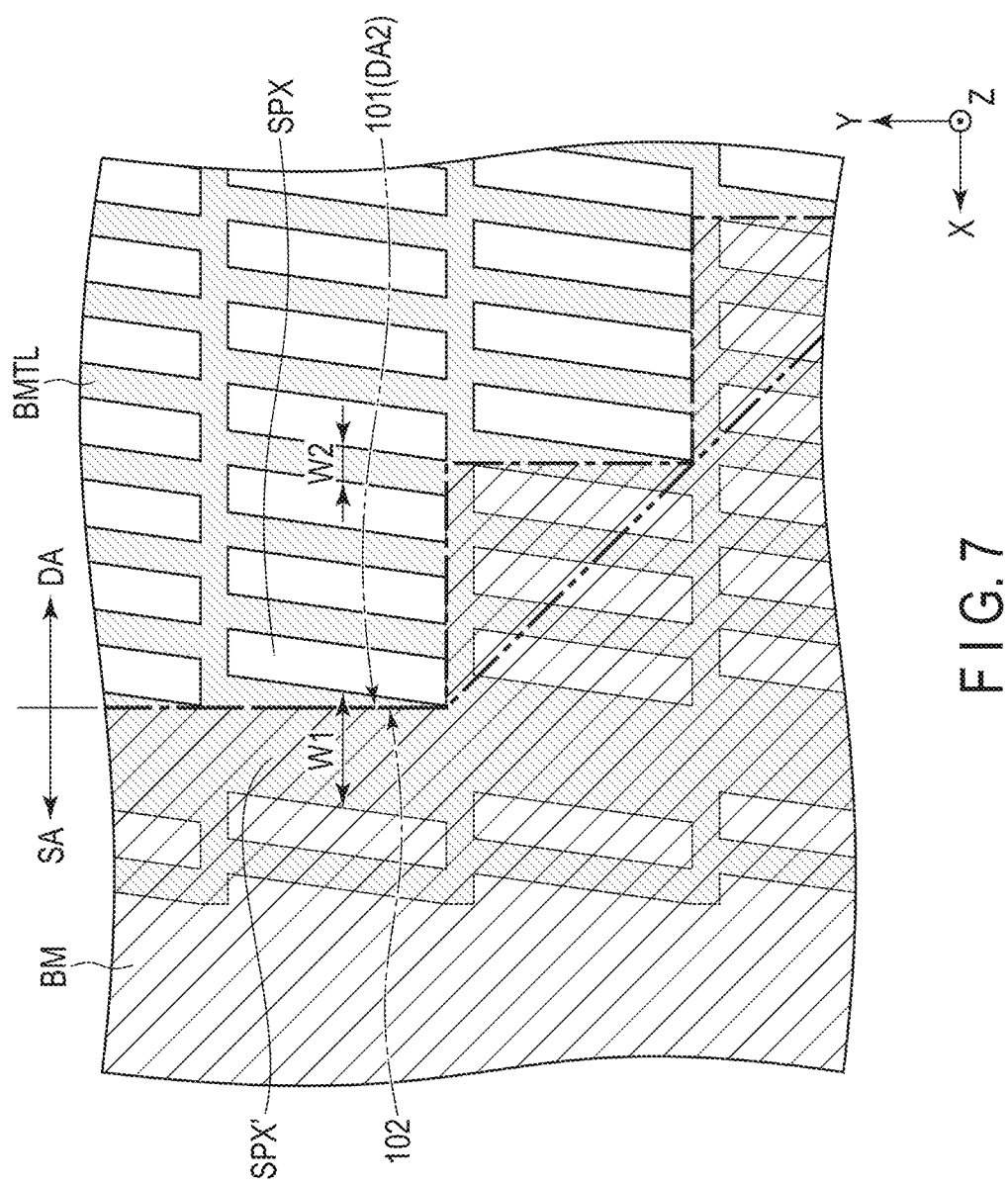
FIG. 7 is a diagram illustrating the first light-shielding layer in the present embodiment.

As shown in FIG. 7, the first light-shielding layer BMTL of the present embodiment is formed to have an aperture overlapping with each of the sub-pixels SP in the display area DA as in the comparative example of the present embodiment. The present embodiment is different from the comparative example in the widths in the X direction of the position overlapping with the end portion 101 elongating in the Y direction of the display area DA. Specifically, in the present embodiment, the width W1 in the X direction of the first light-shielding layer BMTL arranged at the position overlapping with the end portion 101 elongating in the Y direction of the display area DA is wider than the width W2 in the X direction of the first light-shielding layer BMTL arranged in the display area DA. The width W2 corresponds to the width between two apertures which overlap with adjacent sub-pixels SPX in the X direction respectively, among the plurality of sub-pixels SP. The width W1 is, for example, 5 µm or more.

In other words, as shown in FIG. 7, the first light-shielding layer BMTL of the present embodiment has a shape that does not form an aperture overlapping with at least some of the plurality of dummy pixels SPX' (the dummy pixels SPX' arrayed in the Y direction along the end portion 101 elongating along the Y direction of the display area DA). In other words, the first light-shielding layer BMTL is formed such that the width W1 is wider than the width in the X direction of each of the apertures overlapping with the subpixels SPX and the dummy pixels SPX'.

Figure 8:
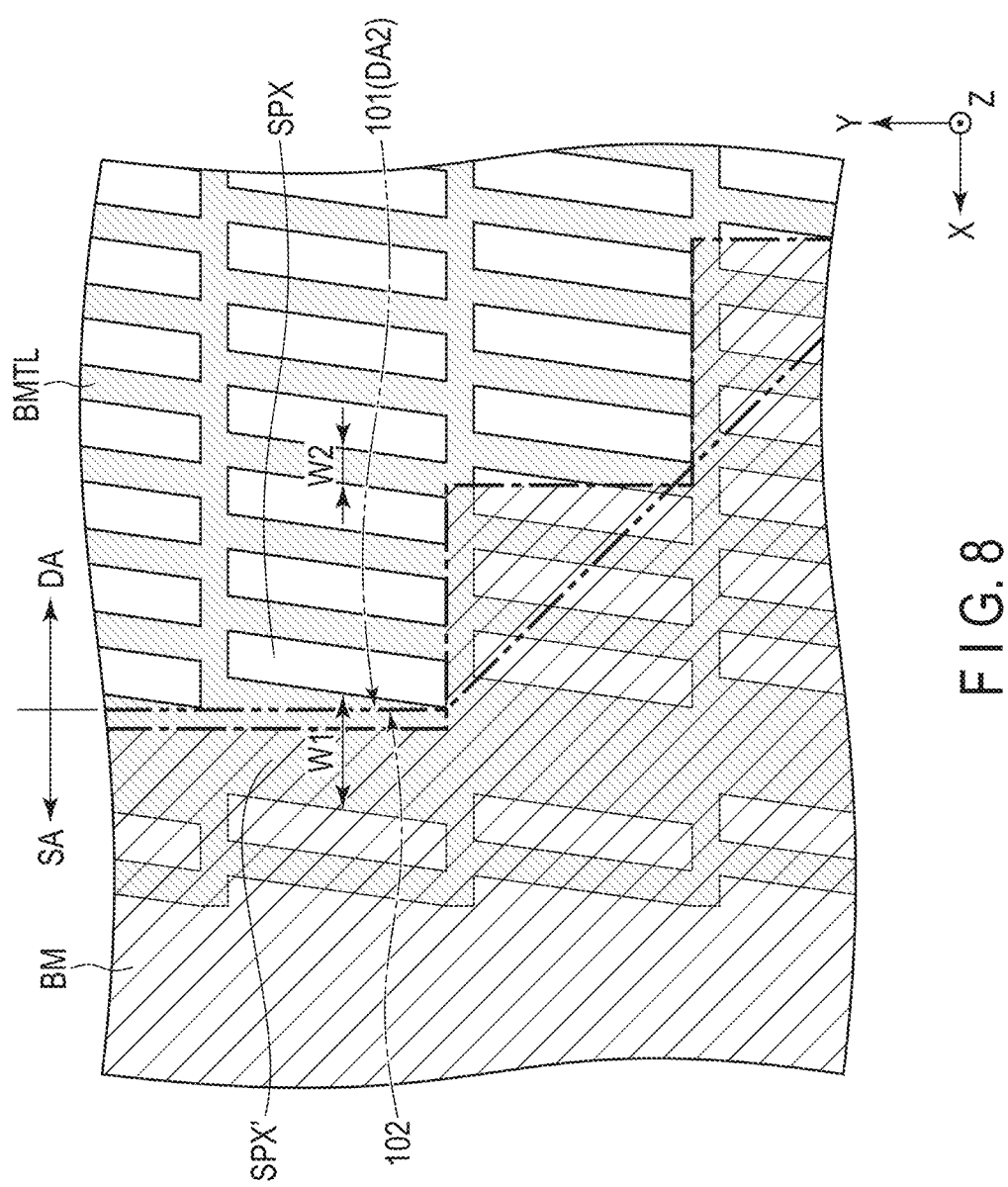
FIG. 8 is a diagram illustrating the first light-shielding layer in the present embodiment.

According to this, light from the dummy pixels SPX' arranged in the vicinity of the end portion 101 elongating in the Y direction of the display area DA is shielded by the first light-shielding layer BMTL having the width W1 even when the second substrate SUB2 is misaligned in the X direction in the bonding of the first substrate SUB1 and the second substrate SUB2, as shown in FIG. 8. Thus, the present embodiment can suppress the degradation in display quality that occurs in the comparative example of the present embodiment.

The above description describes the width in the X direction of the first light-shielding layer BMTL arranged at the position overlapping with the end portion 101 elongating in the Y direction of the display area DA. However, as shown in FIG. 9, the above description applies to the width in the Y direction of the first light-shielding layer BMTL arranged at the position overlapping with an end portion 103 (in other words, the side DA1 of the display area DA) elongating in the X direction of the display area DA.

In this case, a width W3 in the Y direction of the first light-shielding layer BMTL arranged at the position overlapping with the end portion 103 elongating in the X direction of the display area DA needs to be wider than the width W4 in the Y direction of the first light-shielding layer BMTL arranged in the display area DA. The width W3 is, for example, 5 µm or more.

Figure 10:
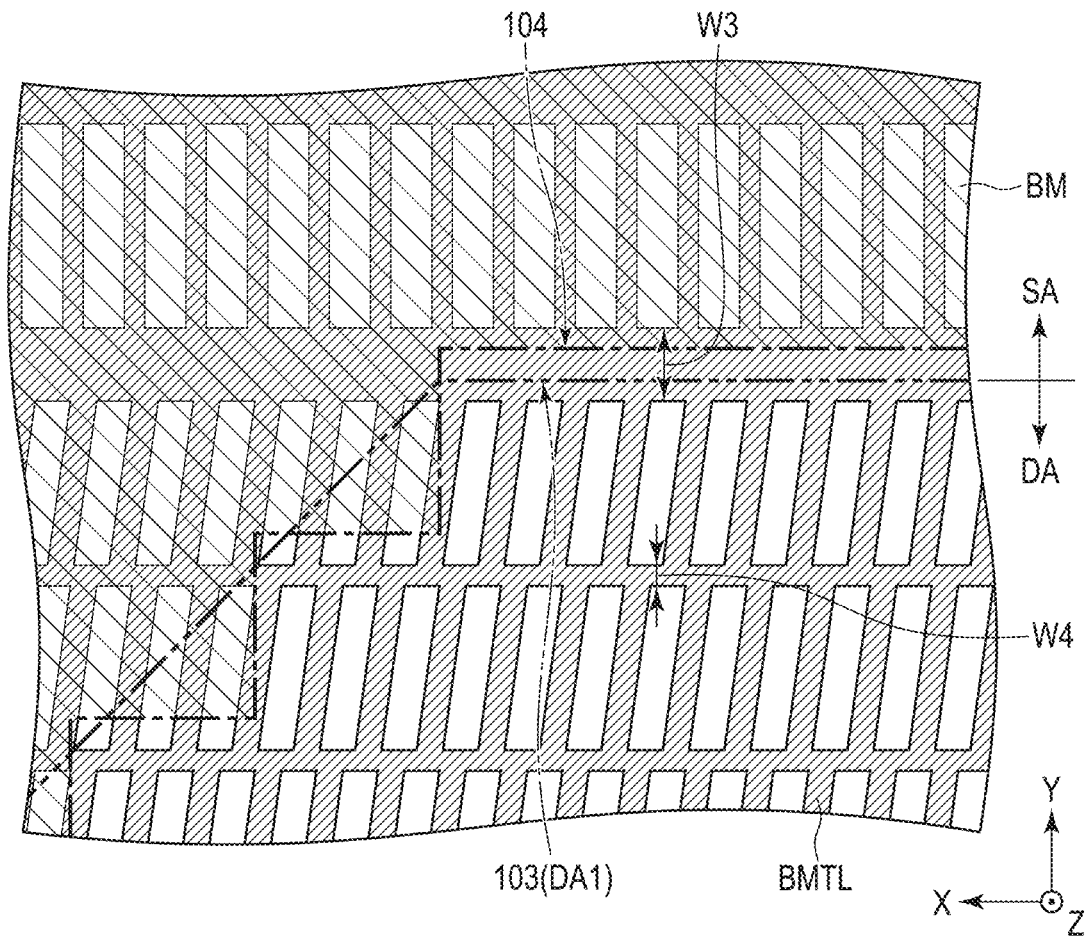
FIG. 10 is a diagram illustrating the first light-shielding layer in the present embodiment.

According to this, as shown in FIG. 10, light leakage can be suppressed even if the second substrate SUB2 is misaligned in the Y direction in the bonding of the first substrate SUB1 and the second substrate SUB2.

Figure 9:
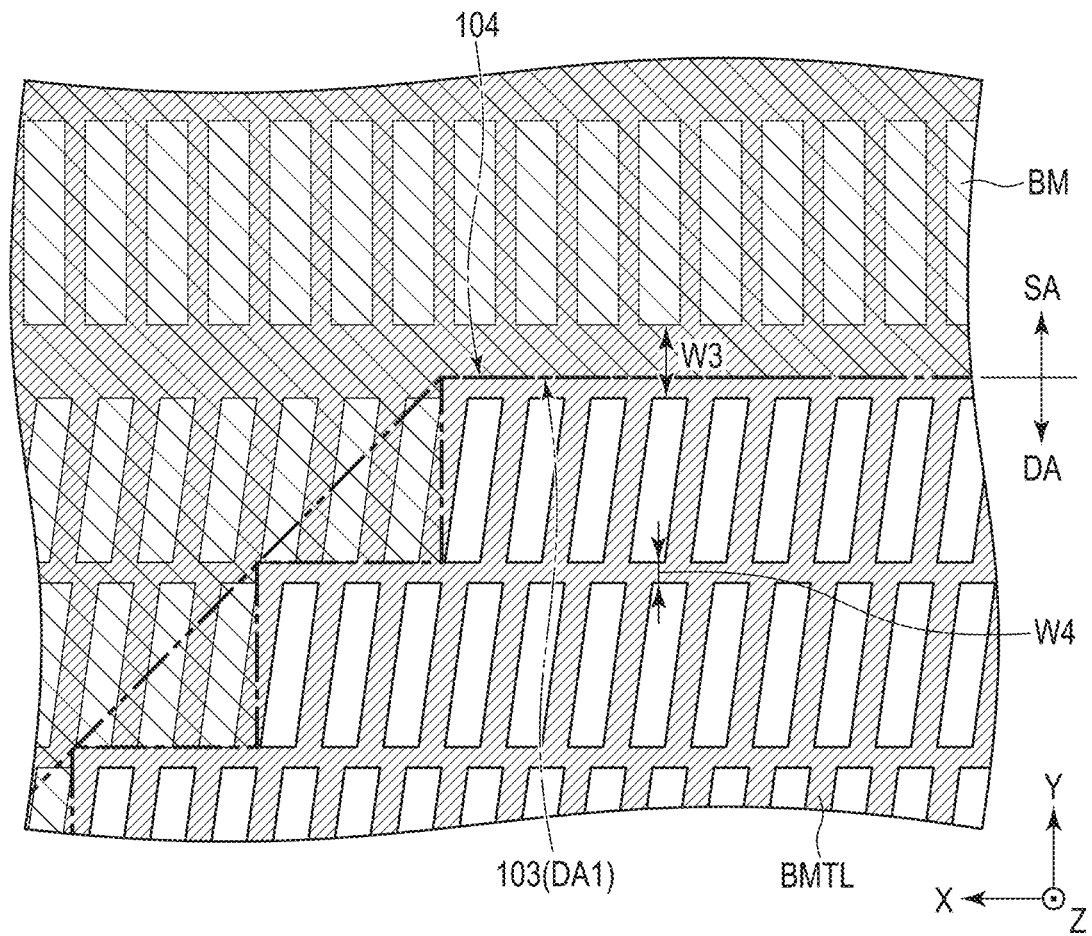
FIG. 9 is the diagram illustrating the first light-shielding layer in the present embodiment.

In FIG. 9 and FIG. 10, the shapes of the apertures that are formed in the surrounding area SA, that is closer to the tip of the Y direction than the end portion elongating in the X direction of the display area DA is, are different from the shapes of the apertures shown in FIG. 8 and FIG. 9 for the sake of designing. However, the shapes of the apertures shown in FIG. 9 and FIG. 10 that are formed in the surrounding area SA, that is closer to the tip of the Y direction side than the end portion elongating in the X direction of the display area DA are the same as the shapes of the apertures shown in FIG. 8 and FIG. 9.

The first light-shielding layer BMTL, for example, shown in FIG. 8 can shield light from the dummy pixels SPX' arranged in the vicinity of the end portion 101 elongating in the Y direction of the display area DA even when the second substrate SUB2 is misaligned in the X direction. However, this first light-shielding layer BMTL cannot shield light from the dummy pixels SPX' overlapping with the end portion elongating in the direction intersecting the X direction and the Y direction of the display area DA (in other words, the display side DA3 of the display area DA). In this case, the display quality in the vicinity of the end portion elongating in the direction intersecting the X direction and the Y direction of the display area DA is degraded. This point applies to the first light-shielding layer BMTL shown in FIG. 10 as well.

Here, the liquid crystal layer LC transmits light from the illumination device when a potential difference is formed between the pixel electrode and the common electrode (in other words, when a pixel potential is applied to the pixel electrode) and does not transmit the light from the illumination device when the potential difference is not formed.

Therefore, the present embodiment suppresses the degrade in the display quality in the vicinity of the end portion elongating in the direction intersecting the X direction and the Y direction of the display area DA by making the pixel electrode arranged at a position overlapping with the dummy pixels SPX' have the same potential as the common electrode (hereinafter referred to as a COM potential), (in other words, by making the dummy pixels SPX' always displaying black color).

Figure 11:
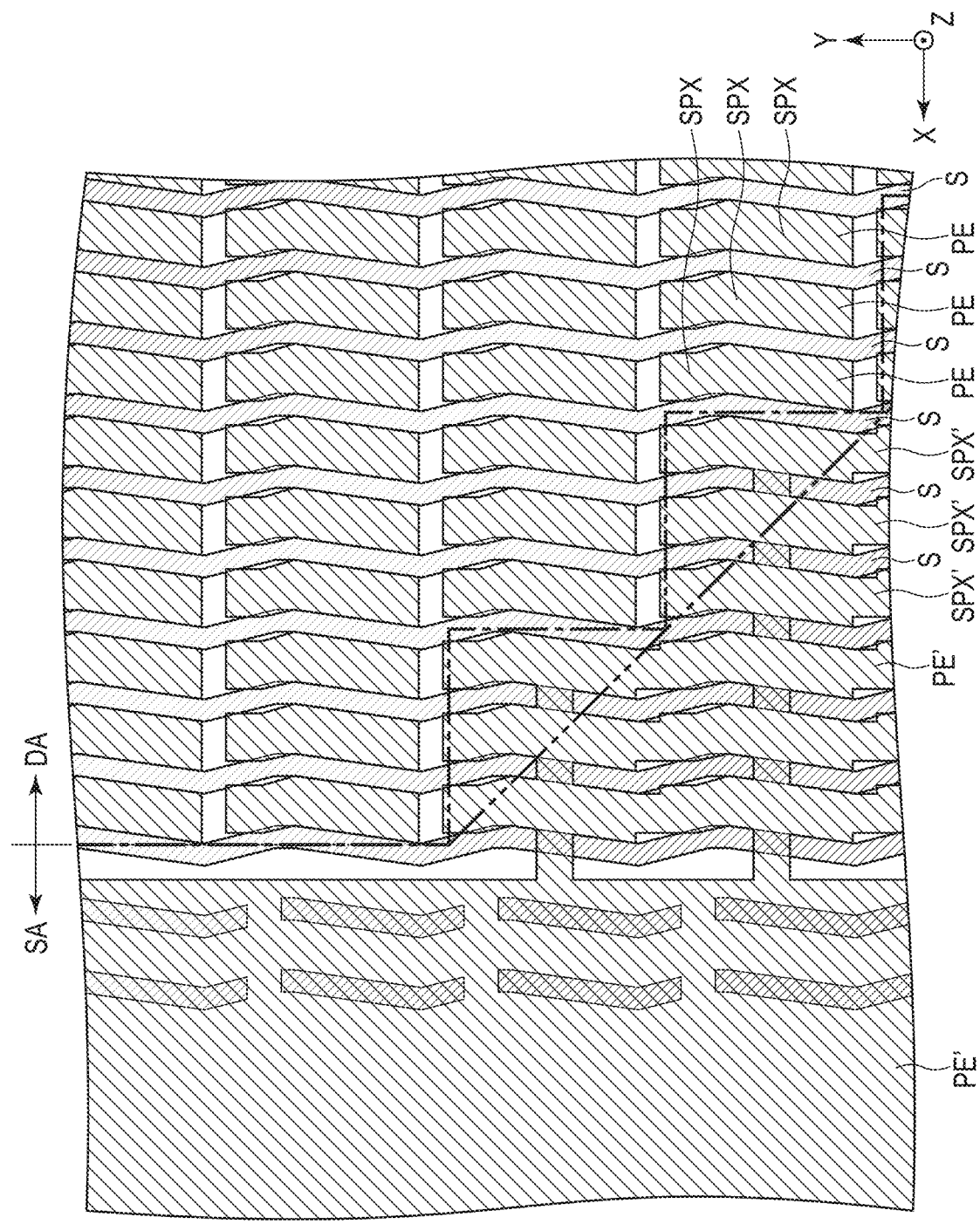
FIG. 11 is a diagram illustrating a pixel electrode in the present embodiment.

The pixel electrode PE of the present embodiment will be described with reference to FIG. 11. FIG. 11 shows an enlarged view of the pixel electrode PE and the signal lines S at the boundary between the display area DA and the surrounding area SA.

As shown in FIG. 11, in the display area DA, the pixel electrode PE is arranged in each of the plurality of sub-pixels SPX. In other words, each of the pixel electrodes PE is formed in an island-like shape at a position in the display area DA, for example, the position being sandwiched by the plurality of signal line S elongating in the Y direction and arrayed in the X direction. By applying a potential (in other words, a pixel potential), that corresponds to an image signal to be supplied to a subpixel SPX corresponding to the pixel electrode PE, to each of the plurality of pixel electrodes PE, an image can be displayed on the display area DA.

In contrast, in the surrounding area SA, instead of arranging pixel electrodes PE for the plurality of dummy pixels SPX' respectively, a pixel electrode PE' integrally formed for the plurality of dummy pixels SPX' is arranged, for example.

Though not shown in FIG. 11, the common electrode CE is arranged over a plurality of sub-pixels SPX arranged in the display area DA and the plurality of dummy pixels SPX' arranged in the surrounding area SA. The present embodiment achieves the dummy pixel SPX' (in other words, the entire surrounding area SA) displaying black by applying the COM potential to the pixel electrode PE'.

According to this, as shown in FIG. 8, even if the second substrate SUB2 is misaligned in the X direction and thus, some of the dummy pixels SPX' overlapping with an end portion elongating in the direction intersecting the X direction and the Y direction of the display area DA do not overlap with the second light-shielding layer BM, the same effect as the light-shielding by the first light-shielding layer BMTL and the second light-shielding layer BM can be obtained by the dummy pixel SPX' displaying black (in other words, the light leakage of the dummy pixel SPX' can be suppressed).

Figure 12:
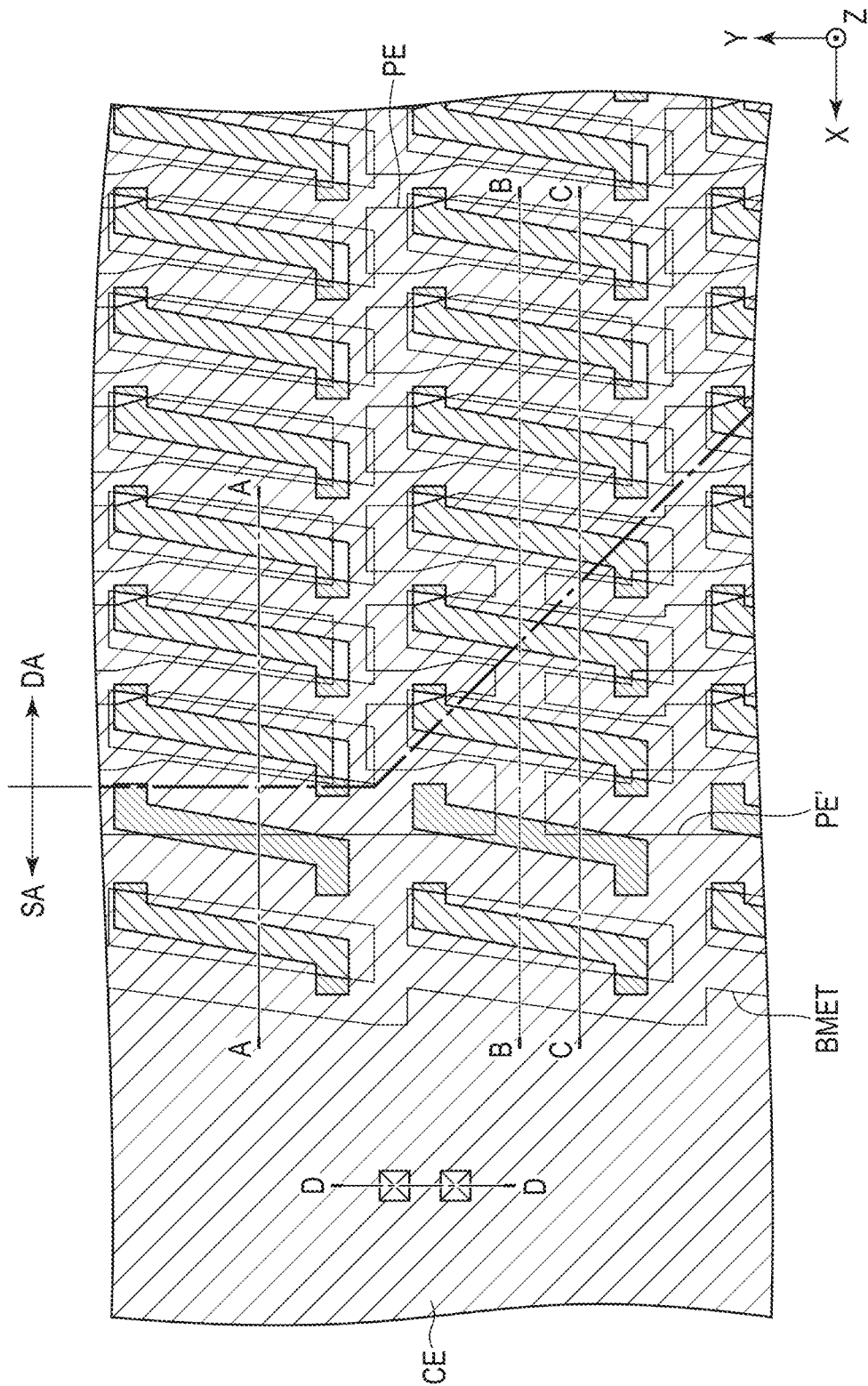
FIG. 12 is a diagram showing the first light-shielding layer, the pixel electrode, and a common electrode in plan view.
Figure 13:
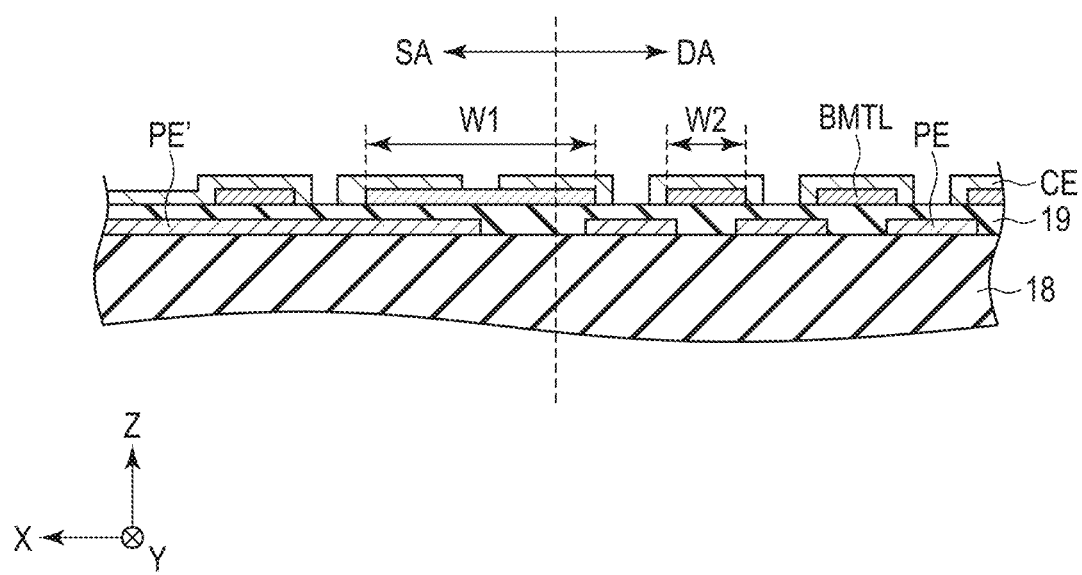
FIG. 13 is a schematic cross-sectional view of the display panel along A-A line shown in FIG. 2.
Figure 15:
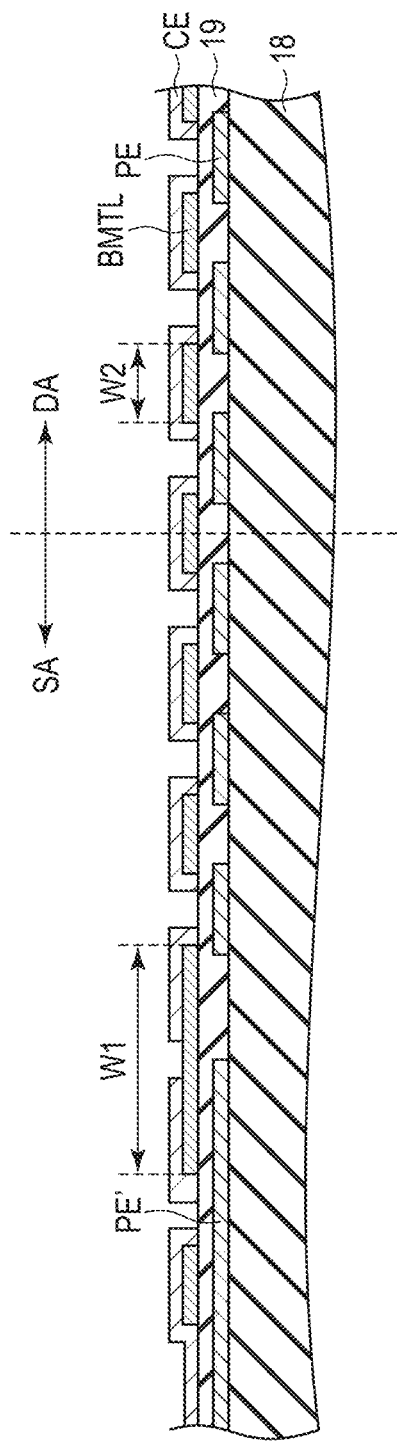
FIG. 15 is a schematic cross-sectional view of the display panel along C-C line shown in FIG. 12.

FIG. 12 is a diagram showing a state in plan view where the first light-shielding layer BMTL, the pixel electrodes PE and PE', and the common electrode CE are stacked. FIG. 13 is a schematic cross-sectional view of the display panel 2 along the A-A line shown in FIG. 12. FIG. 14 is a schematic cross-sectional view of the display panel 2 along B-B line shown in FIG. 12. FIG. 15 is a schematic cross-sectional view of the display panel 2 along C-C line shown in FIG. 12.

FIG. 13 to FIG. 15 are diagrams for explaining the positional relationship of the first light-shielding layer BMTL, the pixel electrodes PE and PE', and the common electrode CE in the cross-sectional view. In FIG. 13 to FIG. 15, some components are simplified for convenience, compared to FIG. 2 and the like.

As shown in FIG. 13 to FIG. 15, the width W1 in the X direction of the first light-shielding layer BMTL arranged at a position overlapping with the boundary between the display area DA and the surrounding area SA (in other words, the end portion of the display area DA elongating in the Y direction) is wider than the width W2 in the X direction of the first light-shielding layer BMTL arranged in the display area DA. In other words, the first light-shielding layer BMTL arranged at the position overlapping with the end portion elongating in the Y direction of the display area DA has a shape in which the aperture overlapping with one sub-pixel defined by the first light-shielding layer BMTL is buried with the first light-shielding layer BMTL.

In addition, as shown in FIG. 13 to FIG. 15, the pixel electrodes PE are arranged in island-like shape so as to respectively correspond to the plurality of sub-pixels SPX in the display area DA, and a pixel electrode PE' having a shape in which some of the plurality of conductive layers corresponding to the plurality of pixel electrodes PE are partially connected is arranged in the surrounding area SA. In the pixel electrodes PE' in the present embodiment, among the plurality of conductive layers corresponding to the pixel electrode PE, each of the conductive layers arranged along the Y direction is connected at the end portion in the Y direction, and the conductive layers arranged along the X direction are connected near the center in the Y direction.

In the present embodiment, the COM potential needs to be applied to the pixel electrode PE'. This COM potential is applied to the pixel electrode PE' through a feeding line arranged in the surrounding area SA.

FIG. 16 is a cross-sectional view of the display panel 2 along the D-D line shown in FIG. 12. FIG. 16 show the configuration for applying the COM potential to the pixel electrode PE', and other constitute elements are shown in simplified manner.

As shown in FIG. 16, a feeding line P is arranged on the insulating layer 15. The feeding line P is arranged on the same layer as the signal line S described above. The feeding line P is covered with the insulating layer 16.

A relay electrode RE' is arranged on the insulating layer 16 (in other words, on the same layer as the relay electrode RE). The relay electrode RE' is connected to the feeding line P through a contact hole h8 formed in the insulating layer 16.

The relay electrode RE' is covered with the insulating layer 17. The insulating layer 18 is arranged on the insulating layer 17 so as to cover the insulating layer 17.

The pixel electrode PE' is arranged on the insulating layer 18. The pixel electrode PE' is connected to the relay electrode RE' through a contact hole h9 formed in the insulating layers 17 and 18.

The pixel electrode PE' is covered with the insulating layer 19. The common electrode CE is provided on the insulating layer 19. The common electrode CE is connected to the pixel electrode PE' through a contact hole h10 formed in the insulating layer 19.

The configuration shown in FIG. 16 can apply the same potential (COM potential) to the pixel electrode PE' and the common electrode CE through the feeding line P and can achieve displaying black in the dummy pixel SPX' in which the pixel electrode PE' is arranged.

As described above, in the present embodiment, the width in the X direction (first direction) of the first light-shielding layer BMTL arranged at the position overlapping with the end portion elongating in the Y direction (second direction) of the display area DA is wider than the width in the X direction of the first light-shielding layer BMTL arranged in the display area DA. This configuration of the present embodiment can shield light from the dummy pixels SPX' (second pixel) by using the first light-shielding layer BMTL and can suppress the degradation in display quality that occurs in the display device 1, even when the second substrate SUB2 including the second light-shielding layer BM surrounding the display area DA in plan view and overlapping with the surrounding area SA is misaligned in the X direction in bonding of the first substrate SUB1 and this second substrate SUB2.

The present embodiment describes the first light-shielding layer BMTL in which an aperture overlapping with the plurality of dummy pixels SPX' arranged in the vicinity of the end portion 101 elongating in the Y direction of the display area DA, among the dummy pixels SPX' arranged in the surrounding area SA, is not formed, as shown in FIG. 7. However, the first light-shielding layer BMTL may have a shape in which an aperture is not formed in the surrounding area SA (in other words, a form in which an aperture overlapping with all of the dummy pixels SPX' is not formed).

As shown in FIG. 9, in the present embodiment, the width in the Y direction of the first light-shielding layer BMTL arranged at a position overlapping with the end portion 103 elongating in the X direction of the display area DA may be wider than the width in the Y direction of the first light-shielding layer BMTL arranged in the display area DA. This configuration can suppress the degradation of display quality in the display device 1 even when the second substrate SUB2 is misaligned in the Y direction in bonding of the first substrate SUB1 and the second substrate SUB2.

Furthermore, in the present embodiment, the configuration in which the COM potential (the same potential as a second potential supplied to the common electrode CE) is applied to the pixel electrode PX' (second pixel electrode) integrally arranged over the plurality of dummy pixels SPX' overlapping with the surrounding area SA as shown in FIG. 11 can achieve displaying black in the dummy pixels SPX'. This configuration can suppress the degradation of display quality in the vicinity of the end portion elongating in the direction intersecting the X direction and the Y direction (in other words, oblique direction) of the display area DA, even when the second substrate SUB2 is misaligned in the X direction or the Y direction in bonding of the first substrate SUB1 and the second substrate SUB2.

In configuration shown in FIG. 11, the same COM potential as the common electrode CE needs to be applied to the pixel electrode PE' arranged over the plurality of dummy pixels SPX' arranged in the surrounding area SA. The application of the COM potential to the pixel electrode PE' and the common electrode CE is achieved by the pixel electrode PE' being connected to the feeding line P through the contact holes h8 and h9, and the common electrode CE being connected to the pixel electrode PE' through the contact hole h10.

The present embodiment may have a configuration that has one of the configurations shown in FIG. 7 and FIG. 9. Further, the present embodiment assumes that, as shown in FIG. 1, the display area DA is a polygonal shape having the side DA1 and DA2 (first side) along the X direction and the Y direction, and the side DA3 (second side) along the direction intersecting the X direction and the Y direction. Further, the configuration shown in FIG. 11 assumes a case where light from the dummy pixels SPX' overlapping with the side DA3 along the direction intersecting the X direction and the Y direction is leaked out. However, when the display area DA has a rectangular shape having sides along the X direction and the Y direction alone, the configuration shown in FIG. 11 may be omitted.

All electronic apparatuses and display devices, which are implementable with arbitrary changes in design by a person of ordinary skill in the art based on the electronic apparatuses and display devices described above as the embodiments of the present invention, belong to the scope of the present invention as long as they encompass the spirit of the present invention.

Various modifications are easily conceivable within the category of the idea of the present invention by a person of ordinary skill in the art, and these modifications are also considered to belong to the scope of the present invention. For example, additions, deletions or changes in design of the constituent elements or additions, omissions or changes in condition of the processes may be arbitrarily made to the above embodiments by a person of ordinary skill in the art, and these modifications also fall within the scope of the present invention as long as they encompass the spirit of the present invention.

In addition, the other advantages of the aspects described in the above embodiments, which are obvious from the descriptions of the specification or which are arbitrarily conceivable by a person of ordinary skill in the art, are considered to be achievable by the present invention as a matter of course.

What is claimed is:

1. A display device, comprising:
a first substrate;
a second substrate opposed to the first substrate; and
a liquid crystal layer held between the first substrate and the second substrate, wherein
the first substrate includes:
a plurality of first pixels overlapping with a display area and a plurality of second pixels overlapping with a surrounding area around the display area, the plurality of first pixels and the plurality of second pixels being arrayed on the first substrate in a matrix in a first direction and a second direction;
a plurality of color filters corresponding to the plurality of first pixels; and
a first light-shielding layer including an aperture overlapping with each of the plurality of first pixels and the plurality of second pixels,
the second substrate includes a second light-shielding layer surrounding the display area and overlapping with the surrounding area in plan view, and
a width in the first direction of the first light-shielding layer arranged at a position overlapping with an end portion elongating in the second direction of the display area is greater than a width between apertures overlapping with each of a plurality of first pixels adjacent to each other in the first direction, among the plurality of first pixels.

2. The display device of claim 1, wherein
the first light-shielding layer has a shape in which an aperture overlapping with second pixels arranged near an end portion extending in the second direction of the display area, among the plurality of second pixels, are not formed.

3. The display device of claim 1, wherein
a width in the first direction of the first light-shielding layer arranged at a position overlapping with the end portion is greater than a width in the first direction of each of an aperture overlapping with the first pixel and an aperture overlapping with the second pixel.

4. The display device of claim 1, wherein
a width in the second direction of the first light-shielding layer arranged at a position overlapping with an end portion elongating in the first direction of the display area is greater than a width between apertures overlapping with each of a plurality of first pixels adjacent to each other in the second direction, among the plurality of first pixels.

5. The display device of claim 1, wherein
the first substrate includes a plurality of first pixel electrodes arranged in each of the plurality of first pixels, a second pixel electrode arranged over the plurality of second pixels, and a common electrode arranged over the plurality of first pixels and the second pixels and overlapping with the plurality of first pixel electrodes and the second pixel electrode,
a first potential is applied to each of the plurality of first pixel electrodes in response to an image signal to be supplied to the first pixel in which the first pixel electrode is arranged, and
a second potential to be applied to the common electrode is applied to the second pixel electrode.

6. The display device of claim 5, further comprising:
a first polarizer opposed to the first substrate and a second polarizer opposed to the second polarizer, wherein
a transmission axis of the first polarizer is orthogonal to a transmission axis of the second polarizer.

7. The display device of claim 5, wherein
the display area has a polygonal shape having a first side along the first direction and the second direction and a second side along a direction intersecting the first direction and the second direction.

8. The display device of claim 7, wherein
the plurality of second pixels include a pixel overlapping with the second side.

9. The display device of claim 5, wherein
the first substrate further includes a feeding line supplying the second potential and a relay electrode, the feeding line and the relay electrode being arranged in the surrounding area,
the relay electrode is connected to the feeding line through a first contact hole formed in a first insulating layer covering the feeding line,
the second pixel electrode is connected to the relay electrode through a second contact hole formed in a second insulating layer arranged on the relay electrode, and
the common electrode is connected to the second pixel electrode through a third contact hole formed in a third insulating layer covering the second pixel electrode.

* * * * *